US008427507B2

(12) United States Patent
Uchida et al.

(10) Patent No.: US 8,427,507 B2
(45) Date of Patent: Apr. 23, 2013

(54) IMAGE PROJECTION SYSTEM ABLE TO EMPHASIZE OR CANCEL OBJECTS DRAWN ON A SURFACE

(75) Inventors: Hisashi Uchida, Kyoto (JP); Yoshiyuki Tamai, Toyokawa (JP); Kazusei Takahashi, Nishinomiya (JP); Masaya Hashimoto, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 245 days.

(21) Appl. No.: 12/880,884

(22) Filed: Sep. 13, 2010

(65) Prior Publication Data
US 2011/0063324 A1 Mar. 17, 2011

(30) Foreign Application Priority Data

Sep. 15, 2009 (JP) ................. 2009-213219

(51) Int. Cl.
*G09G 5/00* (2006.01)
*G09G 5/28* (2006.01)

(52) U.S. Cl.
USPC .......................................... 345/633; 345/629

(58) Field of Classification Search .................. None
See application file for complete search history.

(56) References Cited

U.S. PATENT DOCUMENTS

| | | | | |
|---|---|---|---|---|
| 3,984,828 | A * | 10/1976 | Beyers, Jr. ................. | 345/469.1 |
| 6,249,273 | B1 * | 6/2001 | Plog .............................. | 345/467 |
| 6,809,741 | B1 * | 10/2004 | Bates et al. ..................... | 345/597 |
| 7,130,461 | B2 * | 10/2006 | Rosenholtz .................... | 382/165 |
| 7,802,888 | B2 * | 9/2010 | Wichner et al. ................. | 353/30 |
| 2005/0117073 | A1 * | 6/2005 | Payne et al. ..................... | 348/744 |
| 2007/0222747 | A1 * | 9/2007 | Kritt et al. ...................... | 345/156 |
| 2008/0013057 | A1 * | 1/2008 | Bullock ......................... | 353/121 |
| 2011/0018897 | A1 * | 1/2011 | Uchiyama et al. ............ | 345/619 |

FOREIGN PATENT DOCUMENTS

| | | | |
|---|---|---|---|
| JP | 2001028686 A | * | 1/2001 |
| JP | 2005-354171 | | 12/2005 |
| JP | 2006-235158 | | 9/2006 |
| JP | 2006-277085 | | 10/2006 |
| JP | 2007-194724 | | 8/2007 |
| JP | 2008-287142 | | 11/2008 |
| JP | 2009-171012 | | 7/2009 |

OTHER PUBLICATIONS

M.D. Grossberg, H. Peri, S.K. Nayar and P.N. Belhumeur, "Making One Object Look Like Another: Controlling Appearance using a Projector-Camera System," IEEE Conference on Computer Vision and Pattern Recognition (CVPR), vol. I, pp. 452-459, Jun. 2004.*
S.K. Nayar, H. Peri, M.D. Grossberg and P.N. Belhumeur, "A Projection System with Radiometric Compensation for Screen Imperfections," ICCV Workshop on Projector-Camera Systems (PROCAMS), Oct. 2003.*
Japanese Notice of Ground of Rejection mailed Aug. 16, 2011, directed to counterpart Japanese Patent Application No. 2009-213219; 8 pages.
First Office Action dated Oct. 30, 2012, directed to Chinese Application No. 201010283084.6; 20 pages.

* cited by examiner

*Primary Examiner* — James A Thompson
*Assistant Examiner* — Jason Pringle-Parker
(74) *Attorney, Agent, or Firm* — Morrison & Foerster LLP

(57) ABSTRACT

An image projection system includes a projector to project a projected image onto a drawing surface of a whiteboard, a drawn-image detecting portion to detect a drawn image which is drawn on the drawing surface of the whiteboard while the projector is projecting the projected image, and a modification portion which, in the case where the drawn image is detected, to specify from the projected image which is projected onto the projection surface a part including at least a drawn image part overlapping the detected drawn image, and modify the specified part of the projected image, on the basis of the detected drawn image, so as to emphasize or cancel the drawn image.

17 Claims, 15 Drawing Sheets

F I G. 13A
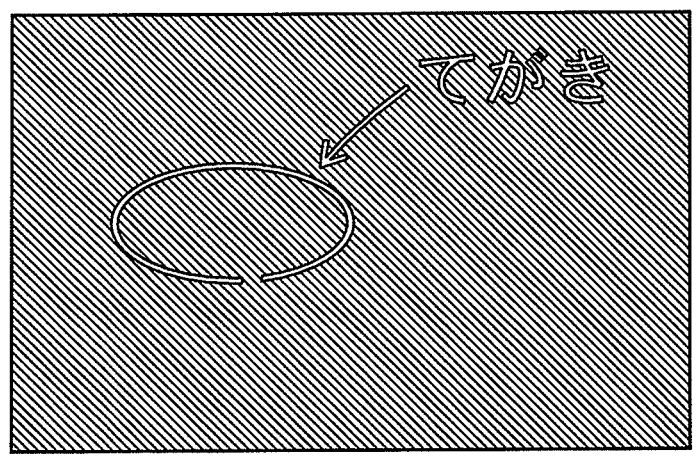
F I G. 13B
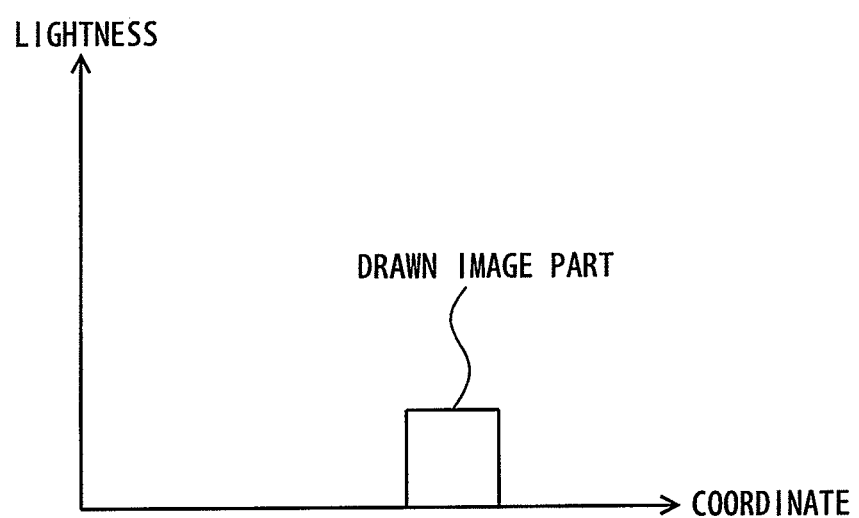

DRAWN IMAGE PART

F I G. 1 8
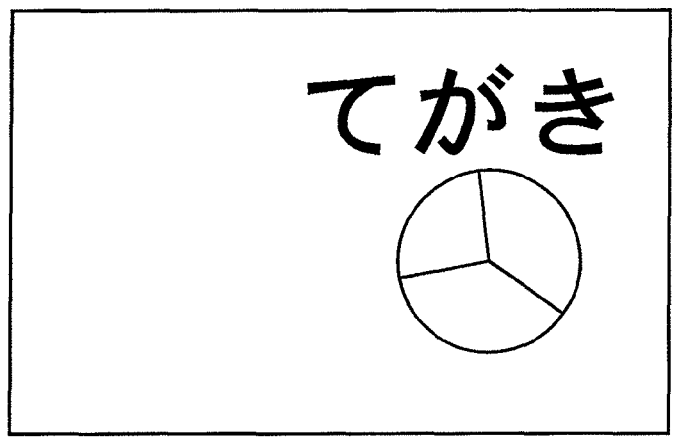
F I G. 1 9
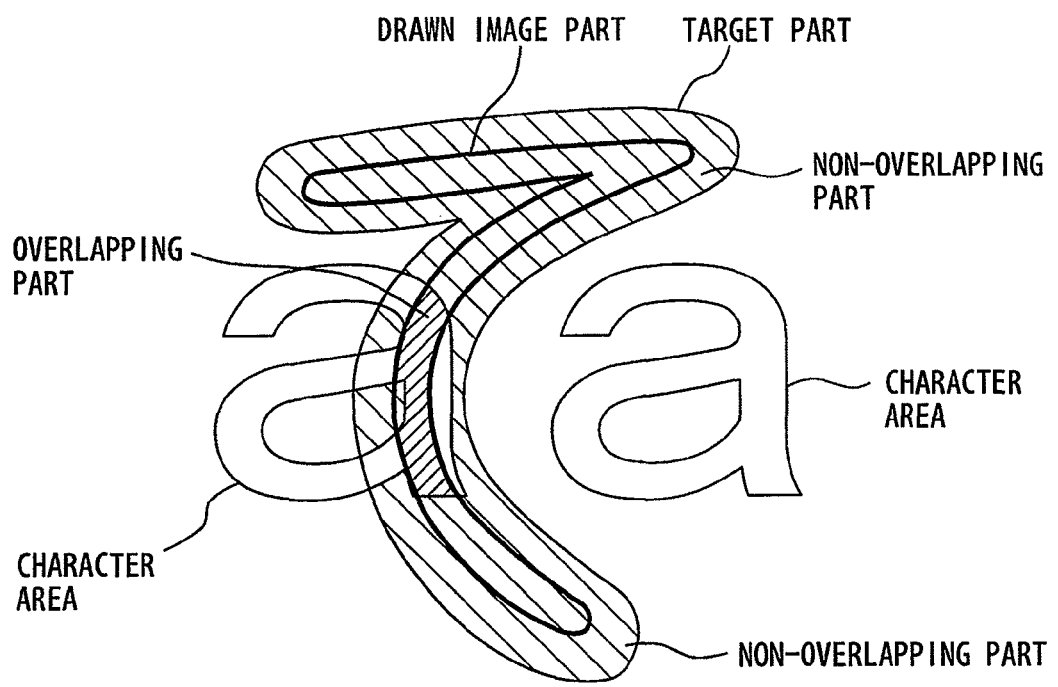

IMAGE PROJECTION SYSTEM ABLE TO EMPHASIZE OR CANCEL OBJECTS DRAWN ON A SURFACE

This application is based on Japanese Patent Application No. 2009-213219 filed with Japan Patent Office on Sep. 15, 2009, the entire content of which is hereby incorporated by reference.

BACKGROUND OF THE INVENTION

1. Field of the Invention

The present invention relates to an image projection system, an image projection method, and an image projection program embodied on a computer readable medium. More particularly, the present invention relates to an image projection system which projects an image onto a projection surface, and an image projection method and an image projection program embodied on a computer readable medium which are executed by the image projection system.

2. Description of the Related Art

In a conference or the like, an image of an explanatory material may be projected onto a projection surface when giving an explanation. Recently, it is often the case that data of an explanatory material is stored in a computer in advance, and a projector, for example, serving as a display device is connected to the computer so as to cause the projector to display an image of the material output from the computer.

Japanese Patent Laid-Open No. 2006-235158 discloses a projection system wherein an image of a projection surface onto which an image has been projected from a first projector is picked up, a compensation parameter for cancelling a color pattern on the projection surface is generated, and a compensation image generated on the basis of the compensation parameter is projected onto the projection surface from a second projector. This projection system is able to project an image as close in color to one projected onto a white screen as possible even when a projection surface has a color pattern.

On the other hand, when a whiteboard on which a character or a graphic can be drawn is used as a projection surface for a projector, an image may be drawn superposed on the image that has been projected. In this case, however, if a background of the image projected onto the whiteboard is similar in lightness to the image drawn on the whiteboard, a viewer may have difficulty in recognizing the drawn image. Further, in the case where a character or a graphic in the drawn image is superposed on a character included in the projected image, the character in the projected image may be hard to be distinguished. Still further, in the case where images of two or more pages are being projected, when a projected image is switched from a first page to a second page after an image has been drawn on the first page, a newly projected image for the second page will be superposed on that image drawn for the first page and left on the whiteboard, causing the projected image of the new page to be hard to be recognized. The conventional projection system described above has not taken such problems into consideration.

SUMMARY OF THE INVENTION

The present invention has been accomplished in view of the foregoing problems, and an object of the present invention is to provide an image projection system which is capable of projecting an image in such a manner that a drawn image or a projected image is readily recognizable.

Another object of the present invention is to provide an image projection method which enables projection of an image in such a manner that a drawn image or a projected image is readily recognizable.

A further object of the present invention is to provide an image projection program embodied on a computer readable medium which enables projection of an image in such a manner that a drawn image or a projected image is readily recognizable.

In order to achieve the above-described objects, according to an aspect of the present invention, an image projection system includes: a projection portion to project a projected image onto a projection surface; a drawn-image detecting portion to detect a drawn image drawn on the projection surface while the projected image is being projected by the projection portion; and a modification portion, in the case where the drawn image is detected, to specify from the projected image which is projected onto the projection surface a part including at least a drawn image part overlapping the detected drawn image, and modify the specified part of the projected image, on the basis of the detected drawn image, so as to emphasize or cancel the drawn image.

According to another aspect of the present invention, an image projection method includes the steps of: projecting a projected image onto a projection surface; detecting a drawn image drawn on the projection surface while the projected image is being projected in the projecting step; and in the case where the drawn image is detected, specifying from the projected image which is projected onto the projection surface a part including at least a drawn image part overlapping the detected drawn image, and modifying the specified part of the projected image, on the basis of the detected drawn image, so as to emphasize or cancel the drawn image.

According to a further aspect of the present invention, an image projection program embodied on a computer readable medium causes a computer to perform the steps of: projecting a projected image onto a projection surface; detecting a drawn image drawn on the projection surface while the projected image is being projected in the projecting step; and in the case where the drawn image is detected, specifying from the projected image which is projected onto the projection surface a part including at least a drawn image part overlapping the detected drawn image, and modifying the specified part of the projected image, on the basis of the detected drawn image, so as to emphasize or cancel the drawn image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13A is a diagram showing an example of a first cancelling compensation image.

FIG. 13B is a diagram partially showing a change in lightness of a first cancelling compensation image.

FIG. 18 is a third diagram showing an example of a drawn image.

FIG. 19 is a diagram showing a part of a picked-up image that is obtained in the state where a modified projected image is being projected.

DESCRIPTION OF THE PREFERRED EMBODIMENTS

Figure 1:
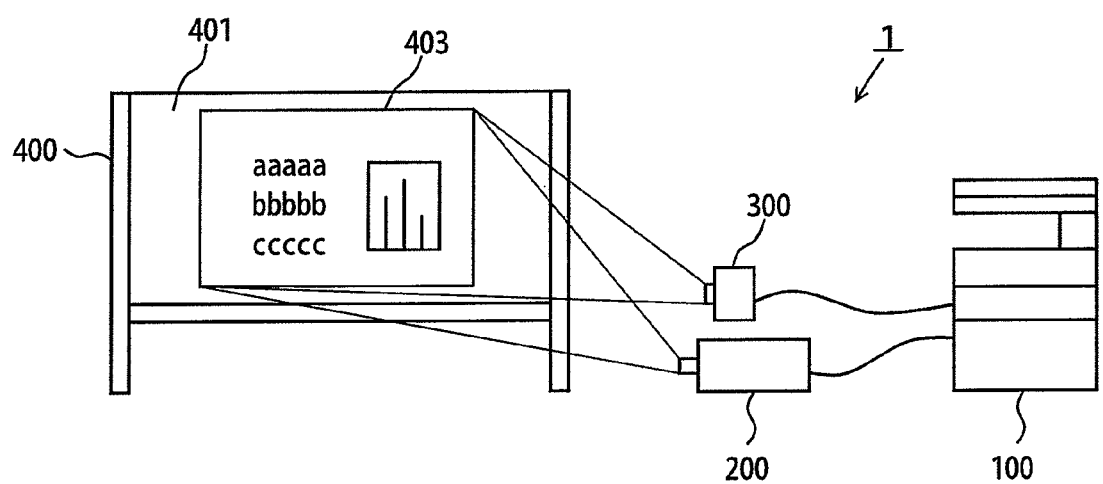
FIG. 1 shows an example of an image projection system according to an embodiment of the present invention.

Embodiments of the present invention will now be described with reference to the drawings. In the following description, like reference characters denote like parts, which have like names and functions, and therefore, detailed description thereof will not be repeated.

FIG. 1 shows an example of an image projection system according to an embodiment of the present invention. Referring to FIG. 1, an image projection system 1 includes a multi function peripheral (MFP) 100 serving as an image processing apparatus, a projector 200, a camera 300, and a whiteboard 400.

In image projection system 1 according to the present embodiment, a presenter at a conference stores image data which is electronic data of documents for presentation, in MFP 100. Here, it is assumed that the image data includes page data for a plurality of pages. From the page data for a plurality of pages included in the image data, MFP 100 transmits to projector 200 page data for a page to be displayed, so as to cause projector 200 to display an image corresponding to the page data. The page data transmitted from MFP 100 to projector 200 may be in any format, as long as it can be read by projector 200. MFP 100 transmits pieces of page data for the respective pages included in the image data sequentially to projector 200, which in turn displays images corresponding to the respective pieces of page data transmitted from MFP 100.

It is noted that the image data stored in MFP 100 may be data generated by a personal computer, or data which MFP 100 obtains by reading an original.

Projector 200 includes a liquid crystal display, a lens, and a light source, and projects an image for the page data received from MFP 100 onto whiteboard 400. The liquid crystal display displays an image. Light emitted from the light source passes through the liquid crystal display to be projected onto whiteboard 400 via the lens. When the light emitted from projector 200 hits a drawing surface 401 of whiteboard 400, an image 403 which is an enlarged version of the image being displayed on the liquid crystal display is projected onto drawing surface 401. In the image projection system according to the present embodiment, drawing surface 401 of whiteboard 400 also serves as a projection surface of projector 200.

Camera 300 is placed such that its angle of view matches drawing surface 401 of whiteboard 400. Camera 300 is controlled by MFP 100 to pick up an image of drawing surface 401 of whiteboard 400 and transmit the picked-up image to MFP 100. In the state where projector 200 is projecting an image of page data, the picked-up image that camera 300 outputs by picking up an image of drawing surface 401 includes image 403 corresponding to the page data projected onto drawing surface 401, while in the state where projector 200 is not projecting any image of page data, the picked-up image output from camera 300 includes a picked-up image of drawing surface 401. Furthermore, in the state where a character or a graphic is drawn on drawing surface 401, the picked-up image that camera 300 outputs by picking up an image of drawing surface 401 includes a drawn image which is drawn on drawing surface 401, while in the state where no character or graphic is drawn on drawing surface 401, the picked-up image output from camera 300 includes no image drawn on drawing surface 401. Still further, in the state where projector 200 is projecting an image of page data and a character or a graphic is drawn on drawing surface 401, the picked-up image that camera 300 outputs by picking up an image of drawing surface 401 includes both of image 403 corresponding to the page data projected onto drawing surface 401 and a drawn image which is drawn on drawing surface 401.

Figure 2:
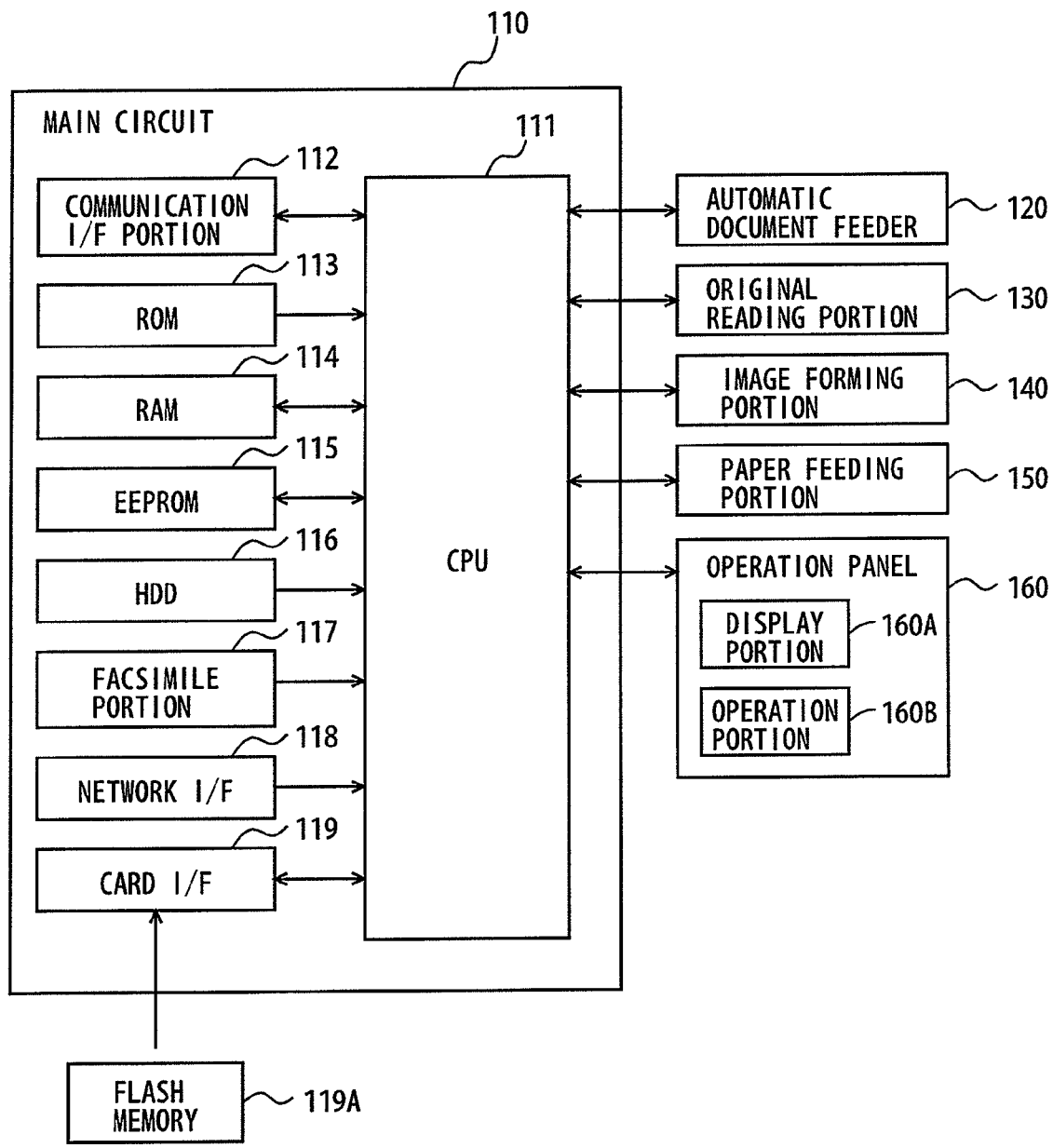
FIG. 2 is a block diagram showing an example of the hardware configuration of an MFP.

FIG. 2 is a block diagram showing an example of the hardware configuration of the MFP. Referring to FIG. 2, MFP 100 includes: a main circuit 110; an original reading portion 130 which reads an original; an automatic document feeder 120 which delivers an original to original reading portion 130; an image forming portion 140 which forms, on a sheet of paper or the like, a still image output from original reading portion 130 that read an original; a paper feeding portion 150 which supplies sheets of paper to image forming portion 140; and an operation panel 160 serving as a user interface. Main circuit 110 includes a central processing unit (CPU) 111, a communication interface (I/F) portion 112, a read only memory (ROM) 113, a random access memory (RAM) 114, an electrically erasable and programmable ROM (EEPROM)

115, a hard disk drive (HDD) 116 as a mass storage, a facsimile portion 117, a network I/F 118, and a card interface (I/F) 119 which may be mounted with a flash memory 119A. CPU 111 is connected with automatic document feeder 120, original reading portion 130, image forming portion 140, paper feeding portion 150, and operation panel 160, and is responsible for overall control of MFP 100.

ROM 113 stores a program to be executed by CPU 111 as well as data necessary for execution of the program. RAM 114 is used as a work area when CPU 111 executes a program. Further, RAM 114 temporarily stores still images that are continuously transmitted from original reading portion 130.

Operation panel 160 is provided on an upper surface of MFP 100, and includes a display portion 160A and an operation portion 160B. Display portion 160A is a display such as a liquid crystal display (LCD) or an organic electro-luminescence display (ELD), and displays an instruction menu for the user, information about acquired image data, and others. Operation portion 160B is provided with a plurality of keys, and accepts input of data such as instructions, characters, and numerical characters, according to the key operations of the user. Operation portion 160B further includes a touch panel provided on display portion 160A.

Communication I/F portion 112 is an interface for connecting MFP 100 to camera 300 and projector 200. Here, it is assumed that communication I/F portion 112 performs serial communication with camera 300 and projector 200. CPU 111 communicates with projector 200 and camera 300 via communication I/F portion 112, for transmission/reception of data.

Facsimile portion 117 is connected to public switched telephone networks (PSTN), and transmits facsimile data to or receives facsimile data from the PSTN. Facsimile portion 117 stores the received facsimile data in HDD 116, or outputs it to image forming portion 140. Image forming portion 140 prints the facsimile data received from facsimile portion 117 on a sheet of paper. Further, facsimile portion 117 converts the data stored in HDD 116 to facsimile data, and transmits it to a facsimile machine connected to the PSTN.

Network I/F 118 is an interface for connecting MFP 100 to a local area network (LAN). CPU 111 can communicate, via network I/F 118, with a computer which is connected to the LAN or to the Internet connected via the LAN. A computer connected to the Internet includes an e-mail server which transmits and receives e-mail. The LAN may be connected in a wired or wireless manner. Furthermore, the network to which network I/F 118 is connected is not necessarily the LAN; it may be the Internet, a wide area network (WAN), public switched telephone networks (PSTN), or the like.

Card I/F 119 is mounted with flash memory 119A. CPU 111 is capable of accessing flash memory 119A via card I/F 119. CPU 111 loads a program recorded on flash memory 119A mounted to card I/F 119, to RAM 114 for execution. It is noted that the program executed by CPU 111 is not restricted to the program recorded on flash memory 119A. CPU 111 may load a program stored in HDD 116 to RAM 114 for execution. In this case, another computer connected to the LAN or the like, which is able to communicate with MFP 100 via network I/F 118, may rewrite the program stored in HDD 116 of MFP 100 or may additionally write a new program. Further, MFP 100 may download a program from another computer connected to the network, and store the program in HDD 116.

The recording medium for storing the program is not restricted to flash memory 119A. It may be an optical disk (compact disc-read only memory (CD-ROM), magnetic optical disc (MO), mini disc (MD), digital versatile disc (DVD)), an IC card, an optical card, or a semiconductor memory such as a mask ROM, an EPROM, an EEPROM, or the like.

As used herein, the "program" includes, not only the program directly executable by CPU 111, but also a source program, a compressed program, an encrypted program, and others.

In image projection system 1 according to the present embodiment, MFP 100 is connected to projector 200 and camera 300 via communication I/F portion 112 for serial communication. Alternatively, MFP 100 may be connected via network I/F 118, or it may perform a parallel communication.

Figure 3:
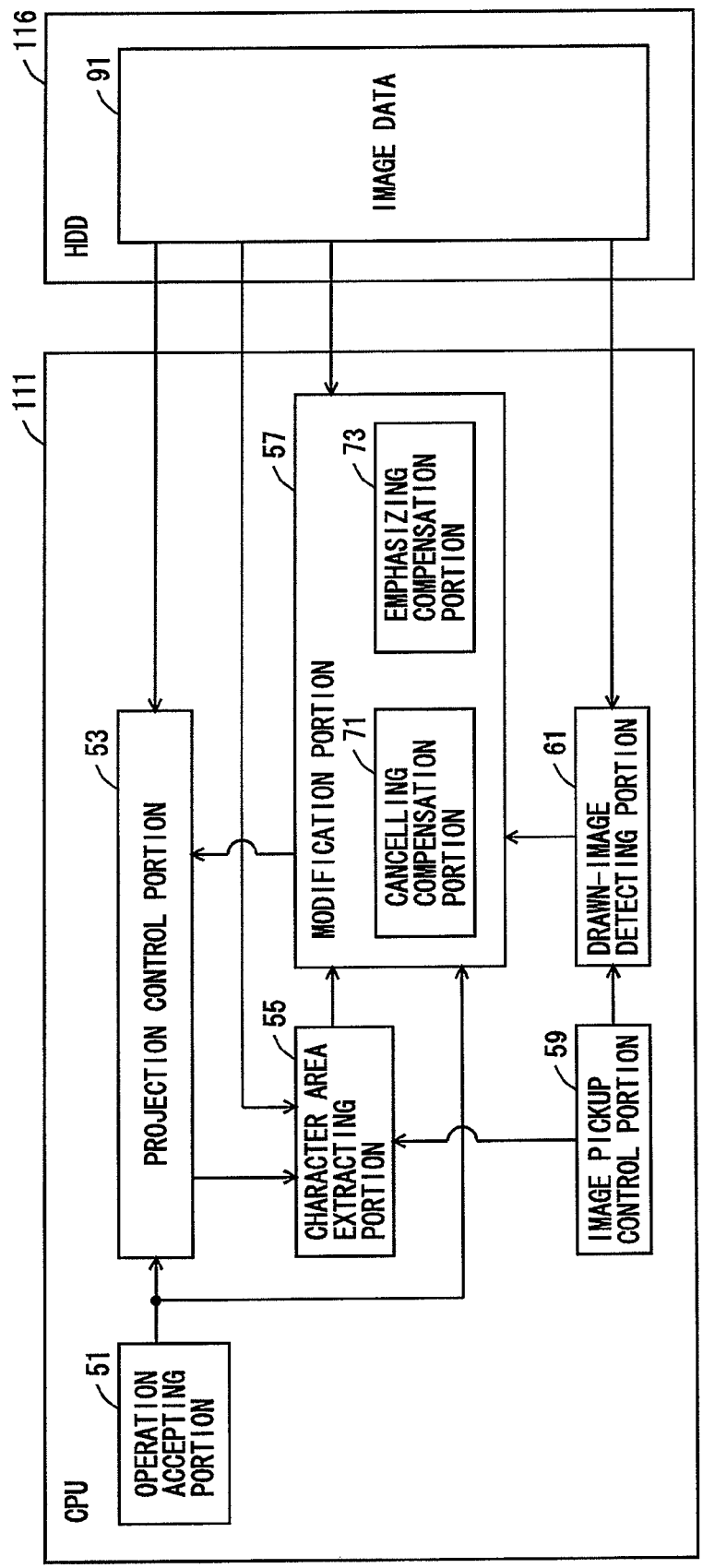
FIG. 3 is a functional block diagram schematically showing the functions of a CPU included in the MFP.

FIG. 3 is a functional block diagram schematically showing the functions of a CPU included in the MFP. The functions shown in FIG. 3 are implemented as CPU 111 included in MFP 100 executes an image projection program stored in ROM 113 or flash memory 119A. Referring to FIG. 3, the functions implemented by CPU 111 includes: an operation accepting portion 51 which accepts an operation by a user; a projection control portion 53 for controlling projector 200; an image pickup control portion 59 for controlling camera 300; a drawn-image detecting portion 61 for detecting a drawn image from within an image picked up by camera 300; a modification portion 57 for modifying a projected image which is projected by projector 200; and a character area extracting portion 55 for extracting a character from a projected image which is projected by projector 200.

Operation accepting portion 51 accepts an operation which is input into operation portion 160B by a user, and outputs the accepted operation to projection control portion 53 and modification portion 57. In the case where MFP 100 is remotely operated, operation accepting portion 51 accepts an operation that a user inputs into a remote operation terminal which is connected to communication I/F portion 112 or network I/F 118. For example, projector 200 may be configured to function as a remote operation terminal. Specifically, an operation screen for a remote operation may be transmitted to projector 200 via communication I/F portion 112 so that projector 200 displays the operation screen on a display such as an LCD. In this case, when a user inputs an operation into projector 200 in accordance with the operation screen, projector 200 transmits the input operation to MFP 100. Furthermore, in the case where projector 200 is connected to MFP 100 via a LAN, MFP 100 may be configured to serve as a Web server. In this case, when a browsing program is installed into projector 200, the operation screen for a remote operation can be transmitted as a Web page from MFP 100 to projector 200. This allows projector 200 to function as a remote operation terminal without the need of installing therein a dedicated program for remotely operating MFP 100.

Projection control portion 53 controls projector 200 connected via communication I/F portion 112. Projection control portion 53 transmits an image to projector 200 to cause it to project the image. Projection control portion 53, in accordance with an operation received from operation accepting portion 51, reads out image data stored in HDD 116 in advance. Then, projection control portion 53 selects one of a plurality of pieces of page data for a plurality of pages included in the image data in accordance with an operation received from operation accepting portion 51, and transmits an image corresponding to the selected piece of page data to projector 200 via communication I/F portion 112. Herein, an image that projection control portion 53 transmits to projector 200 so as to be projected thereby is referred to as a "projected image". Operations input from operation accepting portion 51 to projection control portion 53 herein include an operation for specifying image data 91, a page down operation for instructing to select page data for a next page, and a page up operation for instructing to select page data for a previous page. Projection control portion 53 firstly selects page data for a first page in the image data and causes projector 200 to project a projected image corresponding to the page data of the first page. Thereafter, projection control portion 53, in accordance with an operation received from operation accepting portion 51, causes projector 200 to project a projected image corresponding to the page data of a selected page.

The projected images that projection control portion 53 causes projector 200 to project include, not only the images corresponding to the page data, but also images which are received from modification portion 57. The images received from modification portion 57 will be described later.

Image pickup control portion 59 controls camera 300 connected via communication I/F portion 112. Image pickup control portion 59 causes camera 300 to pick up an image of a projection surface of projector 200 (i.e. drawing surface 401 of whiteboard 400), and receives a picked-up image output from camera 300. Image pickup control portion 59 outputs the picked-up image to character area extracting portion 55 and drawn-image detecting portion 61.

Drawn-image detecting portion 61 extracts a drawn image from the picked-up image received from image pickup control portion 59. Specifically, a difference between the picked-up image and the image corresponding to the page data which is a basis of the projected image that projection control portion 53 causes projector 200 to project, is extracted as the drawn image. Further, a picked-up image that is received from image pickup control portion 59 while projection control portion 53 is causing projector 200 to project no projected image may be regarded as a drawn image. Drawn-image detecting portion 61 outputs the extracted drawn image to modification portion 57.

Character area extracting portion 55 extracts a character area including a character, from an image corresponding to the page data which is a basis of the projected image that projection control portion 53 is causing projector 200 to project. Character area extracting portion 55 outputs the extracted character area to modification portion 57. Character area extracting portion 55 extracts a character itself as a character area. For extracting a character area from an image, any technique well known in the art may be used. For example, an image may be divided into a plurality of blocks, and any block containing at least a predetermined number of pixels in which a difference in lightness from an adjacent pixel is equal to or greater than a predetermined value may be extracted. Then, in the extracted block, a collection of pixels of which pixel value is equal to or greater than a predetermined value may be extracted as a character. It is noted that a rectangular area surrounding a character may be extracted as a character area.

Modification portion 57, on receipt of a drawn image from drawn-image detecting portion 61, modifies a projected image which is projected by projector 200, and outputs the modified projected image to projection control portion 53. Modification portion 57 includes a cancelling compensation portion 71 and an emphasizing compensation portion 73. When drawn-image detecting portion 61 detects a drawn image while a projected image is being projected, modification portion 57 activates emphasizing compensation portion 73. In the case where projection control portion 53 projects a first projected image and then projects a second projected image that is different from the first projected image, when drawn-image detecting portion 61 detects a drawn image before the second projected image is projected, modification portion 57 activates cancelling compensation portion 71.

Emphasizing compensation portion 73 specifies a drawn image part where the drawn image received from drawn-image detecting portion 61 overlaps the projected image, and modifies a target part in the projected image, which is made up of the drawn image part and its periphery, in such a manner that the drawn image is emphasized. Specifically, emphasizing compensation portion 73 changes the lightness of the target part in the projected image to lightness higher than that of a part surrounding the target part in the projected image. More specifically, emphasizing compensation portion 73 generates a first emphasizing compensation image in which the lightness of the target part is set to a predetermined value and the lightness of the part other than the target part is set to zero, and combines the first emphasizing compensation image with the projected image to thereby modify the projected image.

Figure 4:
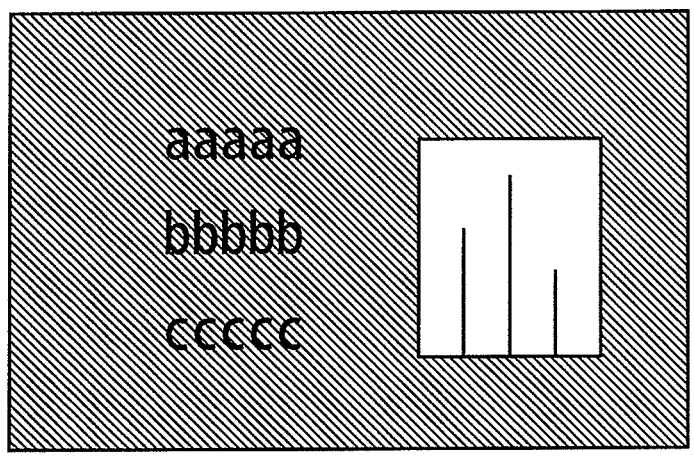
FIG. 4 is a first diagram showing an example of a projected image.
Figure 5:
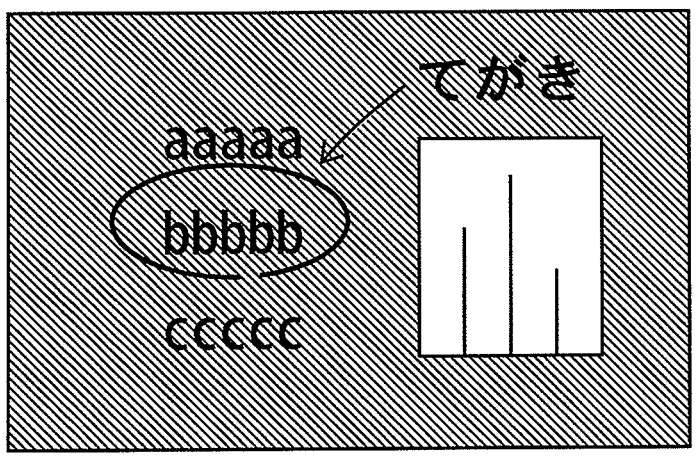
FIG. 5 is a first diagram showing an example of a picked-up image.

Emphasizing compensation will now be described. FIG. 4 is a first diagram showing an example of a projected image. In FIG. 4, the hatched area shows an area of a same color, for example blue. FIG. 5 is a first diagram showing an example of a picked-up image. The picked-up image shown in FIG. 5 is obtained by camera 300 when it picks up an image of drawing surface 401 of whiteboard 400 after characters "てがき" and graphics including an arrow have been drawn on drawing surface 401 in black, for example, in the state where the projected image shown in FIG. 4 is being projected thereon. When the image is drawn in black on the blue area in the projected image, the handwritten characters included in the drawn image may be hard to be recognized.

Figure 6A:
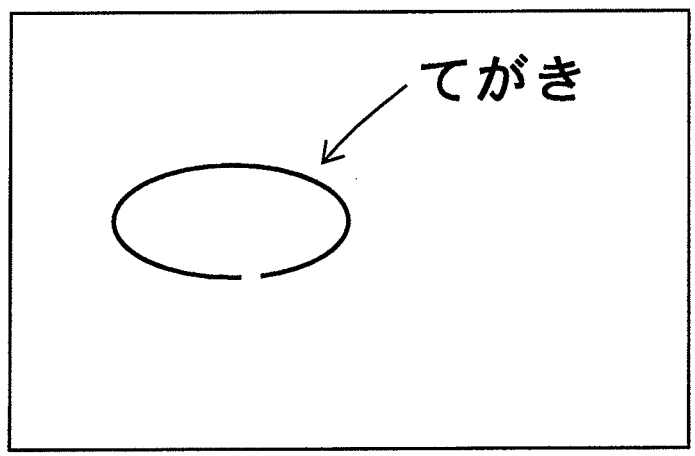
FIG. 6A is a first diagram showing an example of a drawn image.
Figure 6B:
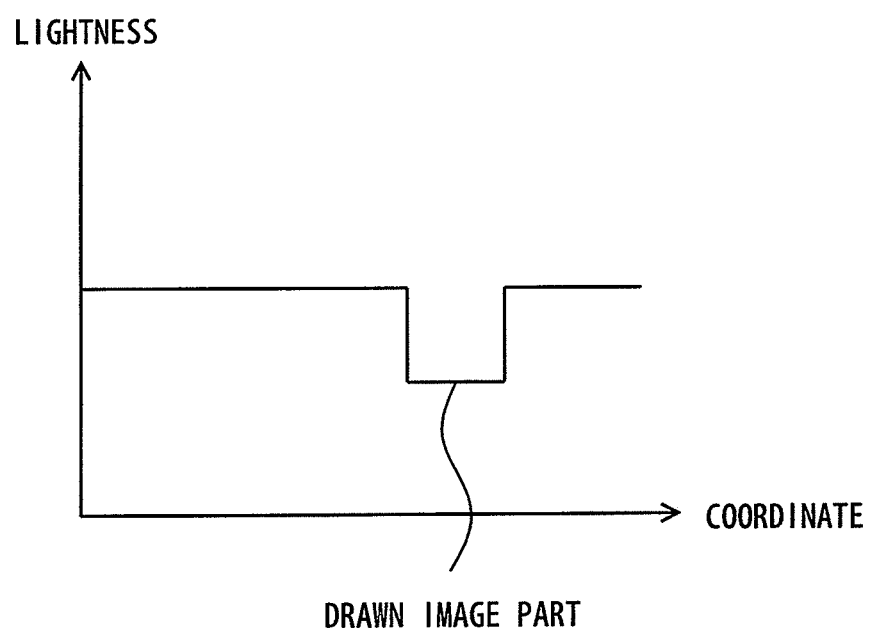
FIG. 6B is a first diagram partially showing a change in lightness of a drawn image.

FIG. 6A is a first diagram showing an example of a drawn image. This drawn image is extracted from a difference between the projected image shown in FIG. 4 and the picked-up image shown in FIG. 5. FIG. 6B is a first diagram partially showing a change in lightness of a drawn image. Referring to FIG. 6B, the drawn image part is lower in lightness than the part other than the drawn image part.

Figure 7A:
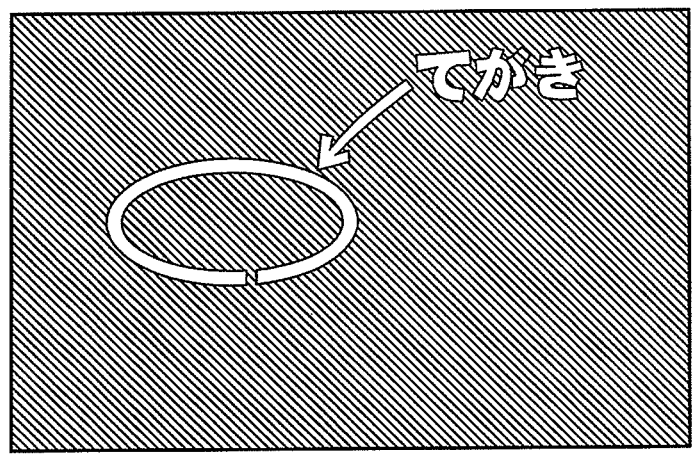
FIG. 7A is a diagram showing an example of a first emphasizing compensation image.
Figure 7B:
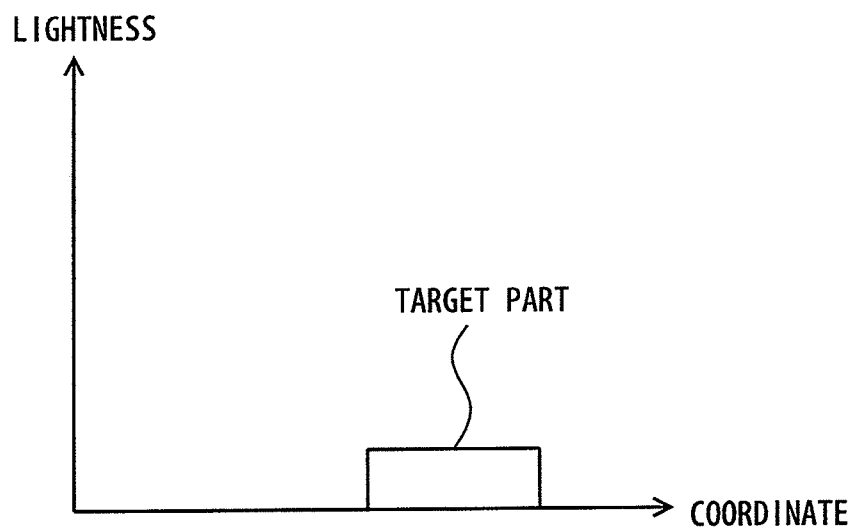
FIG. 7B is a diagram partially showing a change in lightness of a first emphasizing compensation image.

FIG. 7A is a diagram showing an example of a first emphasizing compensation image. FIG. 7B is a diagram partially showing a change in lightness of a first emphasizing compensation image. Referring to FIGS. 7A and 7B, in the first emphasizing compensation image, the lightness of the target part, made up of the drawn image part and its periphery, is set to a predetermined value, and the lightness of the part other than the target part is set to zero.

Figure 8A:
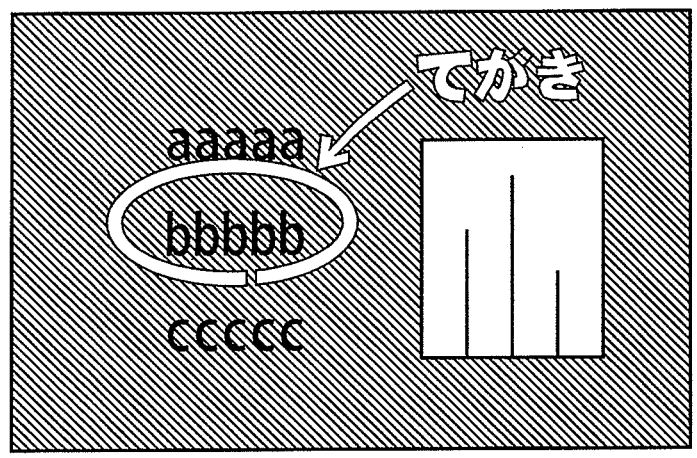
FIG. 8A is a first diagram showing an example of a modified projected image.
Figure 8B:
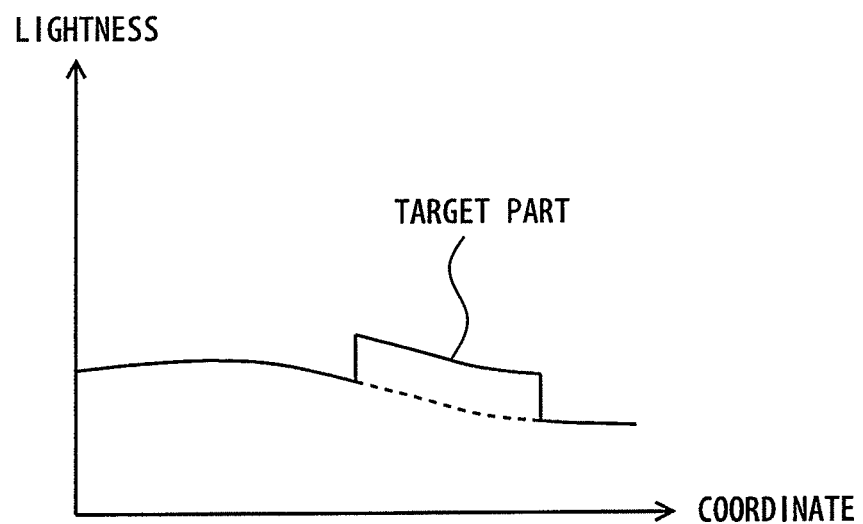
FIG. 8B is a first diagram partially showing a change in lightness between projected images before and after modification.

FIG. 8A is a first diagram showing an example of a modified projected image. FIG. 8B is a first diagram partially showing a change in lightness between projected images before and after modification. In FIG. 8B, a dotted line shows the lightness of the target part before modification, and a solid line shows the lightness of the target part after modification. The lightness of the part other than the target part remains the same before and after the modification. Referring to FIGS. 8A and 8B, the lightness of the target part is higher in the modified projected image than in the projected image before modification.

Figure 9A:
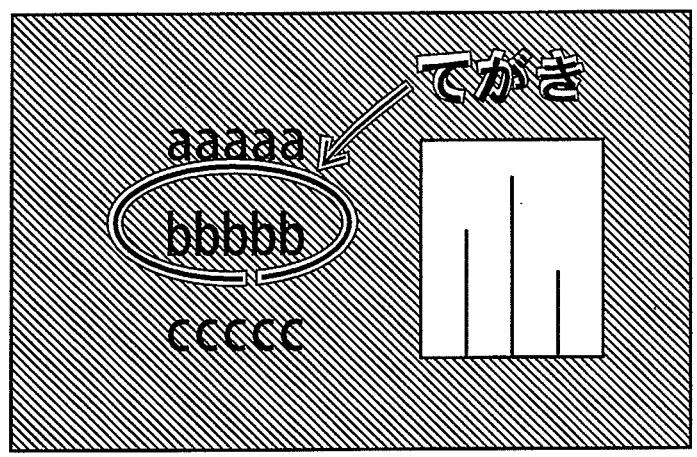
FIG. 9A is a diagram showing an example of a picked-up image that is obtained in the state where a modified projected image is being projected.
Figure 9B:
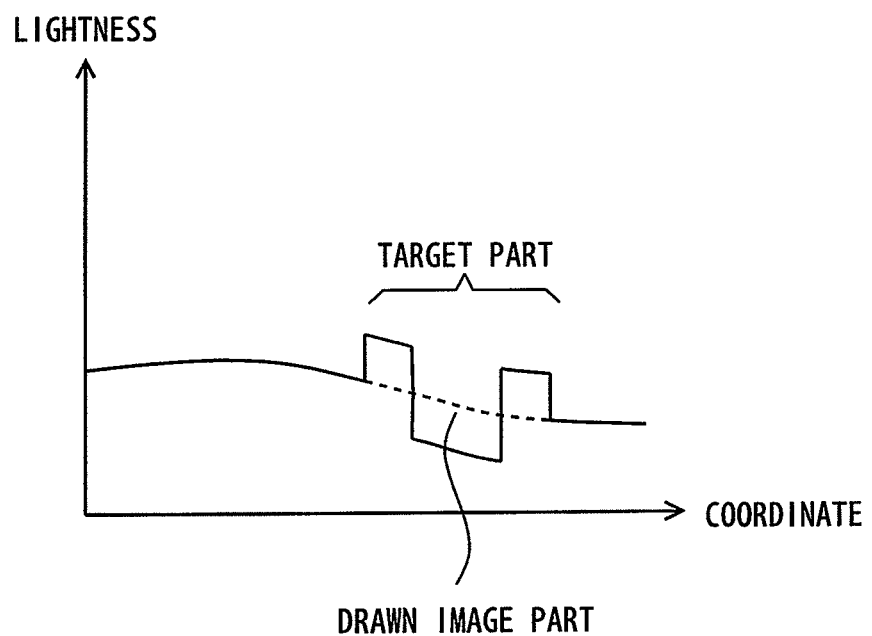
FIG. 9B is a first diagram partially showing a change in lightness of a picked-up image that is obtained in the state where a modified projected image is being projected.

FIG. 9A shows an example of a picked-up image that is obtained in the state where a modified projected image is being projected. FIG. 9B is a first diagram partially showing a change in lightness of a picked-up image that is obtained in the state where a modified projected image is being projected. Referring to FIGS. 9A and 9B, when the modified projected image shown in FIG. 8A is projected onto drawing surface 401 of whiteboard 400, the drawn image that has been drawn on drawing surface 401 comes to fall within the target part of the projected image. This increases the lightness of the area around the drawn image, allowing a viewer to readily recognize the drawn image.

Returning to FIG. 3, when operation accepting portion 51 accepts a page down operation or a page up operation, cancelling compensation portion 71 sets an image corresponding to the page data that is an object of projection as a projected image, specifies a drawn image part in which the projected image and the drawn image received from drawn-image detecting portion 61 overlap each other, and modifies the drawn image part in the projected image in such a manner that the drawn image is cancelled. Specifically, cancelling compensation portion 71 changes the lightness of the drawn image part in the projected image to lightness higher than that of the area surrounding the drawn image part. More specifically, cancelling compensation portion 71 generates a first cancelling compensation image in which the lightness of the drawn image is inverted, and combines the first cancelling compensation image with the projected image. Assuming that lightness of an image ranges from zero to 255, in the first cancelling compensation image, the lightness of a part other than the drawn image part is set to zero, and the lightness of the drawn image part is set to a value that is obtained by subtracting from 255 the lightness of the drawn image part in the drawn image.

In this manner, when an image corresponding to the page data for a new page is projected as a projected image from projector 200, a modified projected image is projected in which the part falling on the drawn image drawn on drawing surface 401 of whiteboard 400 is high in lightness. This can make the image drawn on whiteboard 400 obscure.

Figure 10:
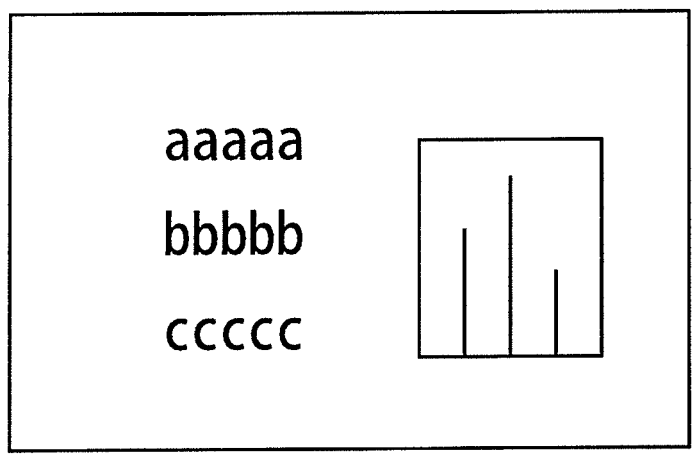
FIG. 10 is a second diagram showing an example of a projected image.
Figure 11:
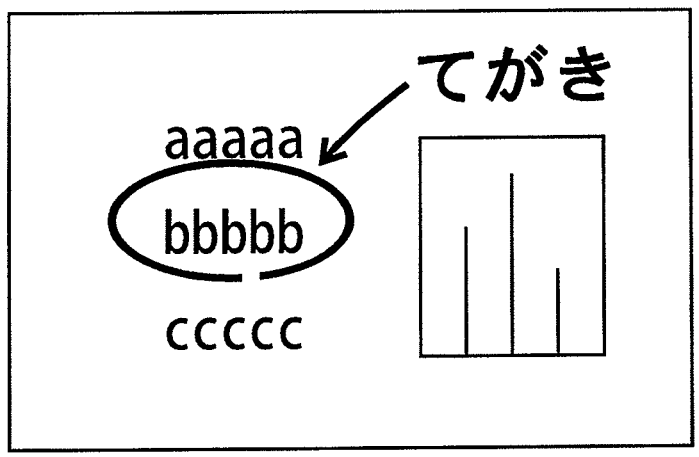
FIG. 11 is a second diagram showing an example of a picked-up image.

Cancelling compensation will now be described. FIG. 10 is a second diagram showing an example of a projected image. FIG. 11 is a second diagram showing an example of a picked-up image. The picked-up image shown in FIG. 11 is obtained by camera 300 when it picks up an image of drawing surface 401 of whiteboard 400 after characters "てがき" and graphics including an arrow have been drawn on drawing surface 401 in black, for example, in the state where the projected image shown in FIG. 10 is being projected thereon.

Figure 12A:
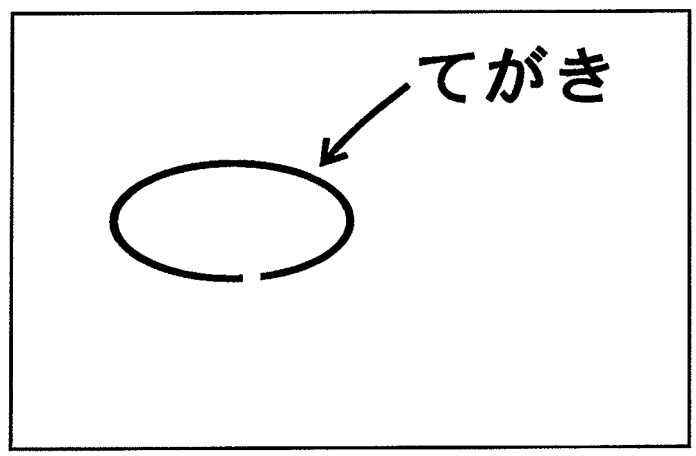
FIG. 12A is a second diagram showing an example of a drawn image.
Figure 12B:
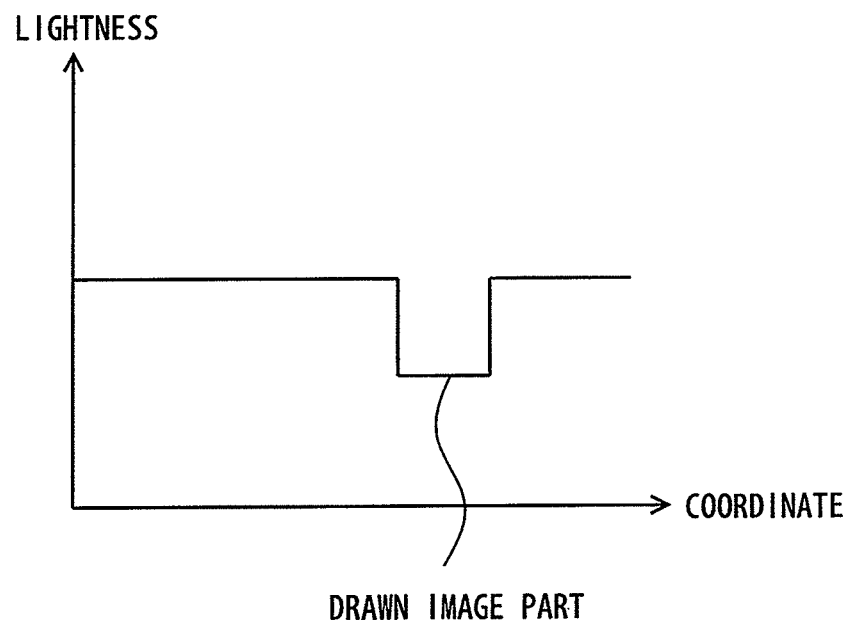
FIG. 12B is a second diagram partially showing a change in lightness of a drawn image.

FIG. 12A is a second diagram showing an example of a drawn image. The drawn image is extracted from a difference between the projected image shown in FIG. 10 and the picked-up image shown in FIG. 11. FIG. 12B is a second diagram partially showing a change in lightness of a drawn image. Referring to FIG. 12B, the lightness of the drawn image part is lower than the lightness of a part other than the drawn image part.

FIG. 13A is a diagram showing an example of a first cancelling compensation image. FIG. 13B is a diagram partially showing a change in lightness of a first cancelling compensation image. Referring to FIGS. 13A and 13B, in the first cancelling compensation image, the lightness of a part other than the drawn image part is set to zero, and the lightness of the drawn image part is set to a value that is obtained by subtracting from 255 the lightness of the drawn image part in the drawn image.

Figure 14A:
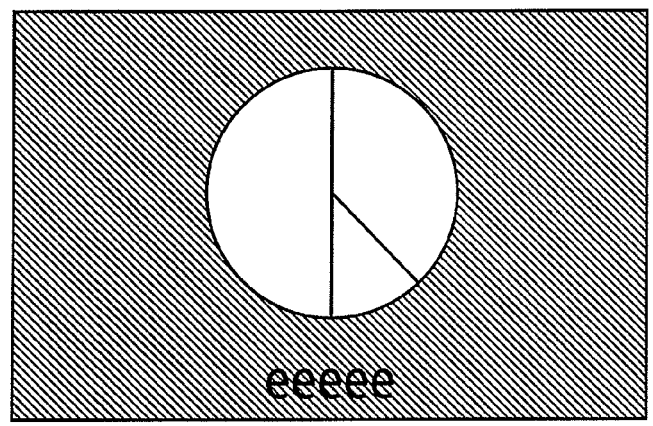
FIG. 14A is a diagram showing an example of a projected image before modification.
Figure 14B:
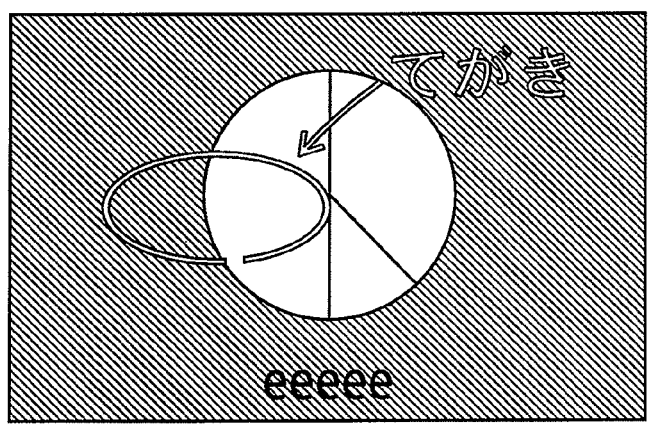
FIG. 14B is a second diagram showing an example of a modified projected image.
Figure 14C:
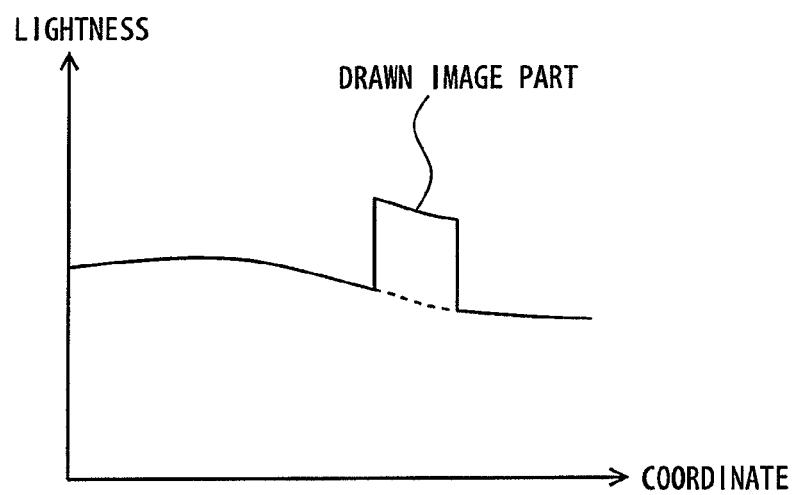
FIG. 14C is a second diagram partially showing a change in lightness between projected images before and after modification.

FIG. 14A is a diagram showing an example of a projected image before modification. FIG. 14B is a second diagram showing an example of a modified projected image. FIG. 14C is a second diagram partially showing a change in lightness between projected images before and after modification. Referring to FIG. 14C, a dotted line shows the lightness of the drawn image part before modification, and a solid line shows the lightness of the drawn image part after modification. The lightness of the part other than the drawn image part remains the same before and after the modification. Referring to FIGS. 14A to 14C, the lightness of the drawn image part is higher in the modified projected image than in the projected image before modification.

Figure 15:
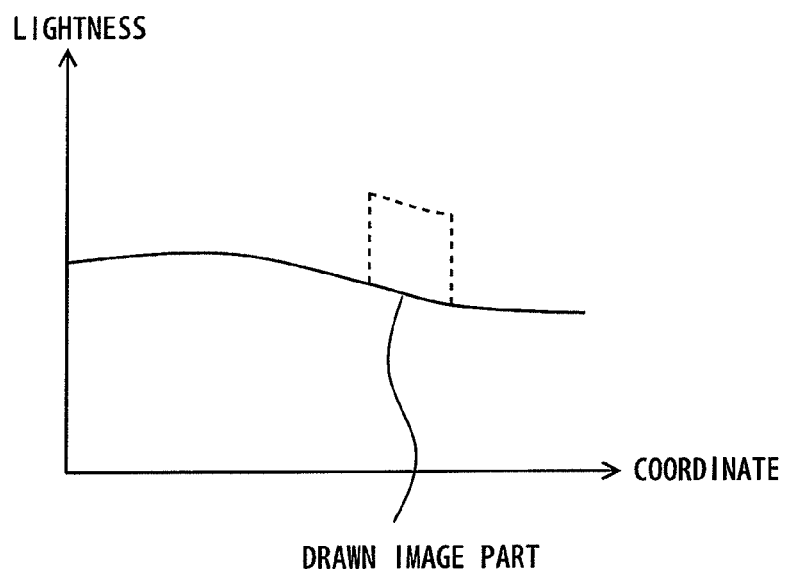
FIG. 15 is a second diagram partially showing a change in lightness of a picked-up image that is obtained in the state where a modified projected image is being projected.

FIG. 15 is a second diagram partially showing a change in lightness of a picked-up image that is obtained in the state where a modified projected image is being projected. Referring to FIG. 15, when the modified projected image is projected onto drawing surface 401 of whiteboard 400, the quantity of light irradiated onto the drawn image drawn on drawing surface 401 is increased, making the drawn image obscure. The resultant image becomes similar to the one that will be obtained when the projected image before modification is projected onto drawing surface 401 of whiteboard 400 on which no image is drawn.

Returning to FIG. 3, in the case where a drawn image is detected by drawn-image detecting portion 61 while a projected image is being projected, and a character area is also received from character area extracting portion 55, then modification portion 57 activates cancelling compensation portion 71 and emphasizing compensation portion 73 simultaneously. Specifically, when a character area is received from character area extracting portion 55, cancelling compensation portion 71 specifies an overlapping part in which the drawn image part and the character area overlap each other, and modifies the overlapping part in such a manner that the drawn image is cancelled. Specifically, cancelling compensation portion 71 changes the lightness of the overlapping part in the projected image to lightness higher than that of the area surrounding the overlapping part in the projected image. More specifically, cancelling compensation portion 71 generates a second cancelling compensation image in which the lightness of the overlapping part is set to a value that is obtained by subtracting from 255 the lightness of the overlapping part in the drawn image, and the lightness of a part other than the overlapping part is set to zero, and combines the second cancelling compensation image with the projected image.

When a character area is received from character area extracting portion 55, emphasizing compensation portion 73 specifies, from within the target part that is made up of the drawn image part in which the projected image and the drawn image overlap each other and its periphery, a non-overlapping part that does not overlap the character area, and modifies the non-overlapping part in the projected image in such a manner that the drawn image is emphasized. Specifically, emphasizing compensation portion 73 changes the lightness of the non-overlapping part in the projected image to lightness higher than that of a part surrounding the non-overlapping part in the projected image. More specifically, emphasizing compensation portion 73 generates a second emphasizing compensation image in which the lightness of the non-overlapping part is set to a predetermined value and the lightness of a part other than the non-overlapping part is set to zero, and combines the second emphasizing compensation image with the projected image that has been combined with the second cancelling compensation image by cancelling compensation portion 71, to thereby modify the projected image.

Figure 16:
FIG. 16 is a third diagram showing an example of a projected image.
Figure 17:
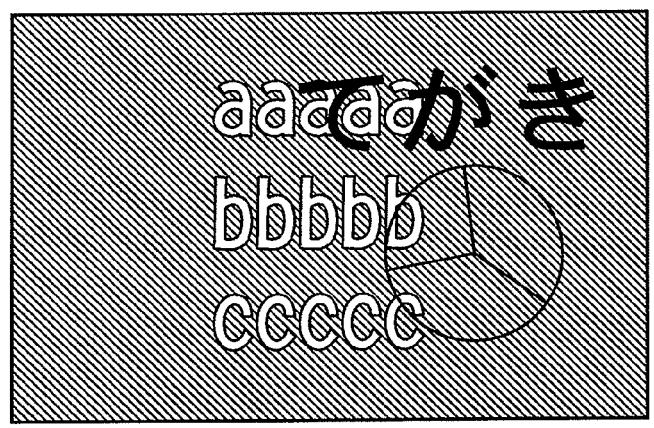
FIG. 17 is a third diagram showing an example of a picked-up image.

A cancelling and emphasizing compensation process will now be described in detail. FIG. 16 is a third diagram showing an example of a projected image. In FIG. 16, the hatched area shows an area of a same color, for example blue. FIG. 17 shows an example of a picked-up image. The picked-up image shown in FIG. 17 is obtained by camera 300 when it picks up an image of drawing surface 401 of whiteboard 400 after characters "てがき" and a circular graph are drawn on drawing surface 401 in black, for example, in the state where the projected image shown in FIG. 16 is being projected thereon.

FIG. 18 is a third diagram showing an example of a drawn image. The drawn image is extracted from a difference between the projected image shown in FIG. 16 and the picked-up image shown in FIG. 17. FIG. 19 is a diagram showing a part of a picked-up image that is obtained in the state where a modified projected image is being projected. In FIG. 19, the overlapping part where the drawn image part and the character area overlap each other is shown by fine hatching, and the non-overlapping part, which is a part of the target part made up of the drawn image part and its periphery and which does not overlap the character area, is shown by coarse hatching. The lightness of the overlapping part shown by the fine hatching is higher than the lightness of its surrounding area. This causes the drawn image to be cancelled, so that the character can be readily recognized. Furthermore, the lightness of the non-overlapping part shown by the coarse hatching is higher than the lightness of a part other than the non-overlapping part in the target part, whereby the drawn image is readily recognizable.

Figure 20:
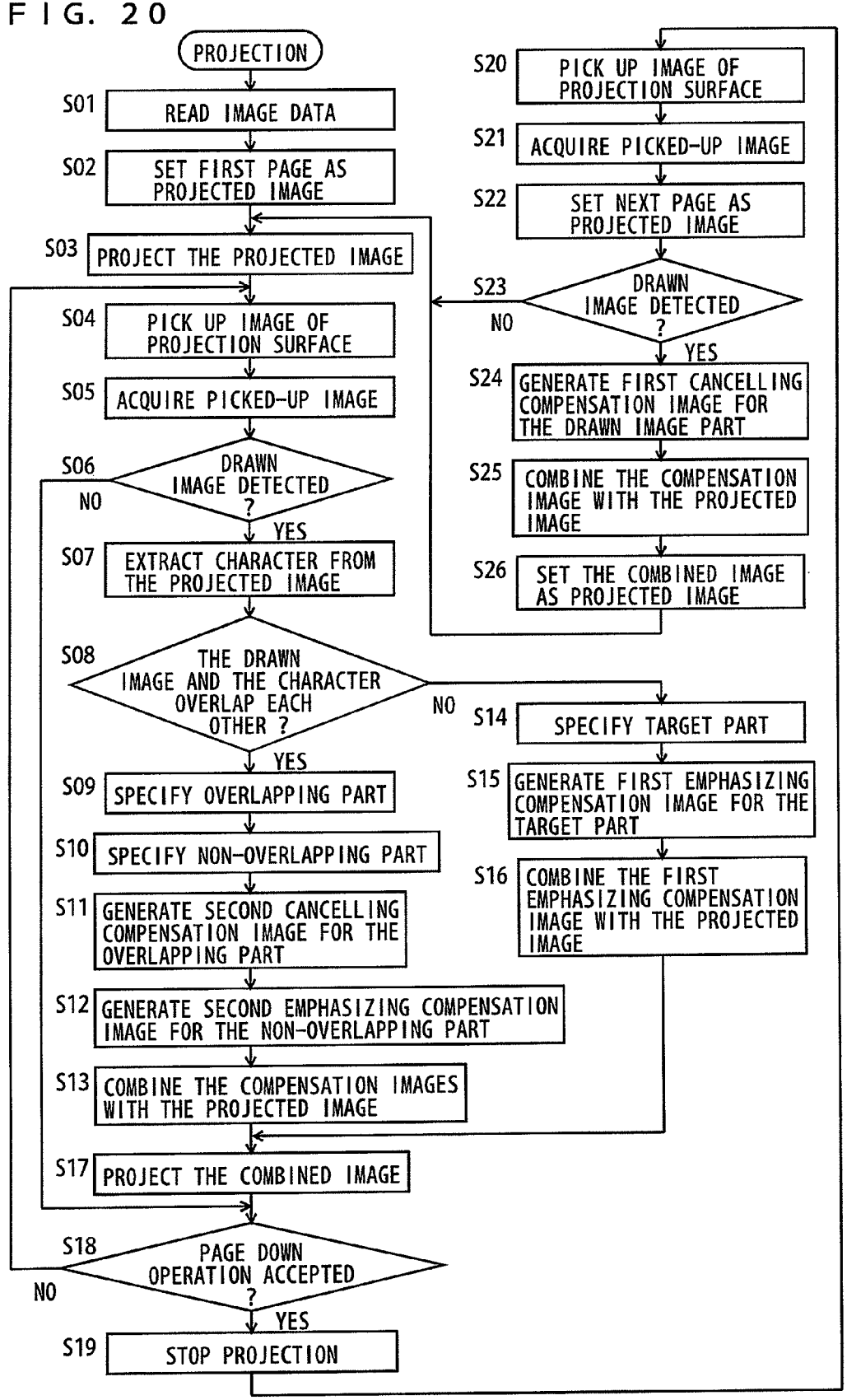
FIG. 20 is a flowchart illustrating an example of the flow of a projection process.

FIG. 20 is a flowchart illustrating an example of the flow of a projection process. The projection process is carried out by CPU 111 included in MFP 100 as CPU 111 executes an image projection program stored in ROM 113 or flash memory 119A. Referring to FIG. 20, CPU 111 reads image data 91 stored in HDD 116 (step S01). CPU 111 specifies and reads image data 91 stored in HDD 116, in accordance with an operation input into operation portion 160B by a user, or in accordance with an operation input into a remote operation terminal by a user in the case where MFP 100 is remotely operated from the remote operation terminal.

Next, CPU 111 sets an image corresponding to page data for a first page included in the image data as a projected image (step S02). Then, CPU 111 causes projector 200 to project the projected image (step S03). At this time, the image corresponding to the page data for the first page is projected onto drawing surface 401 of whiteboard 400.

In the following step S04, CPU 111 controls camera 300 to pick up an image of a projection surface (i.e. drawing surface 401 of whiteboard 400). Then, it acquires a picked-up image output from camera 300 (step S05). CPU 111 then determines whether a drawn image has been detected (step S06). A difference between the projected image projected in step S03 and the picked-up image acquired in step S05 is regarded as a drawn image. If a drawn image has been detected, the process proceeds to step S07; otherwise, the process proceeds to step S18.

In step S07, CPU 111 extracts a character from the projected image projected in step S03. Then, CPU 111 determines whether the drawn image extracted in step S06 and the character extracted in step S07 overlap each other (step S08). Specifically, it is determined whether the drawn image part including the drawn image and a character area including the character overlap each other. If the drawn image part and the character area overlap each other, the process proceeds to step S09, so as to carry out a cancelling and emphasizing compensation process. If the drawn image part and the character area do not overlap each other, the process proceeds to step S14, so as to carry out an emphasizing compensation process. When no character is extracted from the projected image, it is determined that the drawn image and the character do not overlap each other, and the process proceeds to step S14.

In step S09, an overlapping part is specified. The overlapping part is a part in which the drawn image part and the character area overlap each other. Then, a non-overlapping part is specified (step S10). The non-overlapping part is a part of the target part, made up of the drawn image part and its periphery, that does not overlap the character area. In the following step S11, a second cancelling compensation image for cancelling the drawn image is generated. The second cancelling compensation image is an image in which the lightness of the overlapping part is set to a value that is obtained by subtracting from 255 the lightness of the overlapping part in the drawn image, and the lightness of the part other than the overlapping part is set to zero.

Then, in step S12, a second emphasizing compensation image for emphasizing the drawn image is generated. The second emphasizing compensation image is an image in which the lightness of the non-overlapping part is set to a predetermined value, and the lightness of the part other than the non-overlapping part is set to zero. In the following step S13, the second cancelling compensation image generated in step S11 and the second emphasizing compensation image generated in step S12 are combined with the projected image projected in step S04 to thereby generate a combined image. Then, CPU 111 causes projector 200 to project the combined image (step S17). At this time, while the drawn image is drawn on drawing surface 401 of whiteboard 400, a modified projected image is projected in which the overlapping part where the drawn image part and the character area overlap each other is higher in lightness than its surrounding area and, in the target part made up of the drawn image part and its periphery, the non-overlapping part that does not overlap the character area is higher in lightness than its surrounding area. As a result, in the case where a drawn image and a character overlap each other, a projected image can be projected so as to make both the drawn image and the character distinguishable.

On the other hand, in step S14, a target part is specified. The target part is a part made up of the drawn image part and its periphery. In the following step S15, a first emphasizing compensation image for emphasizing a drawn image is generated. The first emphasizing compensation image is an image in which the lightness of the target part is set to a predetermined value and the lightness of the part other than the target part is set to zero. In the following step S16, the first emphasizing compensation image generated in step S15 is combined with the projected image projected in step S04 to generate a combined image, and the process proceeds to step S17. In step S17, CPU 111 causes projector 200 to project the combined image generated in step S16. At this time, while the drawn image is drawn on drawing surface 401 of whiteboard 400, a modified projected image is projected in which the target part made up of the drawn image part and its periphery is higher in lightness than its surrounding area. As a result, a projected image can be projected so as to make the drawn image readily distinguishable.

In step S18, it is determined whether a page down operation has been accepted. If so, the process proceeds to step S19; otherwise, the process returns to step S04. While the page down operation is described here, the operation which is accepted is not limited thereto; it may be a page up operation or any other operation for switching a projected image.

In step S19, CPU 111 causes projector 200 to stop projection of an image. Then, CPU 111 controls camera 300 to pick up an image of the projection surface (i.e. drawing surface 401 of whiteboard 400) (step S20), and acquires a picked-up image output from camera 300 (step S21). Then, among the plurality of pieces of page data included in the image data read in step S01, an image corresponding to the page data for the page immediately following the page that has been processed till then is set as a projected image (step S22).

In step S23, it is determined whether a drawn image has been detected. Specifically, it is determined whether the picked-up image acquired in step S21 includes a drawn image. If a drawn image has been detected, the process proceeds to step S24; otherwise, the process returns to step S03.

In step S24, a first cancelling compensation image for cancelling a drawn image is generated. The first cancelling compensation image is an image in which the lightness of the drawn image part including the drawn image is set to a value that is obtained by subtracting from 255 the lightness of the drawn image part in the picked-up image, and the lightness of the part other than the drawn image part is set to zero.

Then, in step S25, the first cancelling compensation image generated in step S24 is combined with the projected image set in step S22 to generate a combined image. The combined image is set as a new projected image (step S26), and the process returns to step S03. In step S03, CPU 111 causes projector 200 to project the new projected image, or, in other words, the combined image obtained by combining the first cancelling compensation image with the image corresponding to the new page data. At this time, while the drawn image is drawn on drawing surface 401 of whiteboard 400, a modified projected image is projected in which the drawn image part is higher in lightness than its surrounding area. This causes the drawn image to be cancelled, whereby the projected image for the new page becomes readily recognizable.

As described above, according to image projection system 1 of the present embodiment, when an image drawn on drawing surface 401 of whiteboard 400 is detected while a projected image is being projected thereon, the projected image that is projected onto the projection surface is modified on the basis of the drawn image. Accordingly, it is possible to project a projected image which is modified so as to emphasize or cancel the drawn image drawn on drawing surface 401 of whiteboard 400.

Specifically, a target part, which is made up of a drawn image part where the projected image projected onto drawing surface 401 of whiteboard 400 and the drawn image overlap each other and a periphery of the drawn image part, is modified so as to emphasize the drawn image. This allows the drawn image drawn on drawing surface 401 of whiteboard 400 to be readily recognized.

More specifically, the target part in the projected image is modified so as to have lightness that is higher than the lightness of an area surrounding the target part. This increases the lightness of the area around the drawn image, allowing the drawn image to be separated or distinguished from the projected image, whereby the drawn image becomes readily recognizable.

In the case where a projected image includes a character area in which a character is included, an overlapping part where the character area overlaps the drawn image part in which the projected image and the drawn image overlap each other is modified so as to cancel the drawn image. In addition, a non-overlapping part, which is included in the target part made up of the drawn image part and its periphery and which does not overlap the character area, is modified so as to emphasize the drawn image. As a result, the projected image can be modified in such a manner that both the character included in the projected image and the drawn image are readily recognizable.

Specifically, the overlapping part is modified so as to have lightness that is higher than the lightness of an area surrounding the overlapping part. As a result, the lightness of the overlapping part is increased, causing the quantity of light irradiated onto the drawn image to be increased. This makes the drawn image obscure and, hence, the character readily recognizable.

Further, the non-overlapping part is modified so as to have lightness that is higher than the lightness of an area surrounding the non-overlapping part. As a result, the lightness of the area around the drawn image is increased, enabling the drawn image to be readily recognized.

When a projected image is switched to another image, in the other image, a drawn image part that would overlap the drawn image is modified so as to cancel the drawn image. This causes the drawn image to be cancelled, making the other image readily recognizable.

Specifically, the lightness of the drawn image part is changed to a level higher than the lightness of the area surrounding the drawn image part, so as to cancel the drawn image. This increases the quantity of light irradiated onto the drawn image, thereby making the drawn image obscure.

While image projection system 1 in the above-described embodiment is composed of MFP 100, projector 200, and camera 300, MFP 100 may be replaced with a personal computer as long as it can control projector 200 and camera 300. Furthermore, projector 200 may be configured to have camera 300 built therein and have the functions shown in FIG. 3, in which case image projection system 1 may be implemented by projector 200 alone.

Furthermore, the present invention may of course be understood as an image projection method for performing the process shown in FIG. 20 or as an image projection program for causing a computer to perform the image projection method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image projection system comprising:
a projection portion to project a projected image onto a projection surface;
a drawn-image detecting portion to detect a drawn image drawn on said projection surface while said projected image is being projected by said projection portion; and
a modification portion, in the case where said drawn image is detected, to specify from said projected image which is projected onto said projection surface a part including at least a drawn image part overlapping said detected drawn image, and modify the specified part of said projected image, on the basis of the detected drawn image, so as to emphasize said drawn image, wherein said modification portion includes an emphasizing compensation portion which specifies a target part including the drawn image part in which said projected image being projected onto said projection surface and said detected drawn image overlap each other and a periphery of the drawn image part, and modifies said target part so as to emphasize said drawn image.

2. The image projection system according to claim 1, wherein said emphasizing compensation portion modifies said target part so as to have lightness higher than lightness of an area surrounding said target part.

3. The image projection system according to claim 1, further comprising a character area extracting portion to extract a character area including a character from said projected image which is projected, wherein
said modification portion includes
a cancelling compensation portion, in the case where said character area is extracted, to specify an overlapping part where said extracted character area overlaps the drawn image part in which said projected image being projected onto said projection surface and said detected drawn image overlap each other, and modify said overlapping part so as to cancel said drawn image, and an emphasizing compensation portion, in the case where said character area is extracted, to specify, from a target part including the drawn image part in which said projected image being projected onto said projection surface and said detected drawn image overlap each other and a periphery of the drawn image part, a non-overlapping part that does not overlap said extracted character area, and modify said non-overlapping part so as to emphasize said drawn image.

4. The image projection system according to claim 3, wherein said cancelling compensation portion modifies said overlapping part so as to have lightness higher than lightness of an area surrounding said overlapping part.

5. The image projection system according to claim 3, wherein said emphasizing compensation portion modifies said non-overlapping part so as to have lightness higher than lightness of an area surrounding said non-overlapping part.

6. The image projection system according to claim 1, wherein said modification portion includes a cancelling compensation portion which specifies a drawn image part in which said projected image and said detected drawn image overlap each other, and modifies said drawn image part so as to cancel said drawn image.

7. The image projection system according to claim 6, wherein in the state where said projection portion projects a first projected image and a second projected image successively in this order, in the case where said drawn-image detecting portion detects a drawn image before said second projected image is projected, said cancelling compensation portion modifies said second projected image.

8. The image projection system according to claim 6, wherein said cancelling compensation portion modifies said drawn image part so as to have lightness higher than lightness of an area surrounding said drawn image part.

9. An image projection method comprising the steps of:
projecting a projected image onto a projection surface;
detecting a drawn image drawn on said projection surface while the projected image is being projected in said projecting step; and
in the case where said drawn image is detected, specifying from said projected image which is projected onto the projection surface a part including at least a drawn image part overlapping said detected drawn image, and modifying the specified part of said projected image, on the basis of the detected drawn image, so as to emphasize said drawn image, wherein said modifying step includes an emphasizing compensation step of specifying a target part including the drawn image part in which said projected image being projected onto said projection surface and said detected drawn image overlap each other and a periphery of the drawn image part, and modifying said target part so as to emphasize said drawn image.

10. The image projection method according to claim 9, wherein said emphasizing compensation step includes a step of modifying said target part so as to have lightness higher than lightness of an area surrounding said target part.

11. The image projection method according to claim 9, further comprising the step of extracting a character area including a character from said projected image which is projected, wherein
said modifying step includes
a cancelling compensation step of, in the case where said character area is extracted, specifying an overlapping part where said extracted character area overlaps the drawn image part in which said projected image being projected onto said projection surface and said detected drawn image overlap each other, and modifying said overlapping part so as to cancel said drawn image, and
an emphasizing compensation step of, in the case where said character area is extracted, specifying, from a target part including the drawn image part in which said projected image being projected onto said projection surface and said detected drawn image overlap each other and a periphery of the drawn image part, a non-overlapping part that does not overlap said extracted character area, and modifying said non-overlapping part so as to emphasize said drawn image.

12. The image projection method according to claim 11, wherein said cancelling compensation step includes a step of modifying said overlapping part so as to have lightness higher than lightness of an area surrounding said overlapping part.

13. The image projection method according to claim 11, wherein said emphasizing compensation step includes a step of modifying said non-overlapping part so as to have lightness higher than lightness of an area surrounding said non-overlapping part.

14. The image projection method according to claim 9, wherein said modifying step includes a cancelling compensation step of specifying a drawn image part in which said projected image and said detected drawn image overlap each other and modifying said drawn image part so as to cancel said drawn image.

15. The image projection method according to claim 14, wherein said cancelling compensation step includes a step of, in the state where a first projected image and a second projected image are projected successively in this order in said projecting step, in the case where a drawn image is detected in said detecting step before said second projected image is projected, modifying said second projected image.

16. The image projection method according to claim 14, wherein said cancelling compensation step includes a step of modifying said drawn image part so as to have lightness higher than lightness of an area surrounding said drawn image part.

17. An image projection program embodied on a non-transitory computer readable medium, the program causing a computer to perform the steps of:
projecting a projected image onto a projection surface;
detecting a drawn image drawn on said projection surface while the projected image is being projected in said projecting step; and
in the case where said drawn image is detected, specifying from said projected image which is projected onto the projection surface a part including at least a drawn image part overlapping said detected drawn image, and modifying the specified part of said projected image, on the basis of the detected drawn image, so as to emphasize said drawn image, wherein said specifying includes an emphasizing compensation which specifies a target part including the drawn image part in which said projected image being projected onto said projection surface and said detected drawn image overlap each other and a periphery of the drawn image part, and modifies said target part so as to emphasize said drawn image.

* * * * *